(12) United States Patent
Umeta

(10) Patent No.: US 6,520,412 B1
(45) Date of Patent: Feb. 18, 2003

(54) POS SYSTEM

(75) Inventor: Motoko Umeta, Tokyo (JP)

(73) Assignee: NEC Infrontia Corporation (JP)

( * ) Notice: Subject to any disclaimer, the term of this patent is extended or adjusted under 35 U.S.C. 154(b) by 175 days.

(21) Appl. No.: 09/605,241

(22) Filed: Jun. 28, 2000

(30) Foreign Application Priority Data

Jun. 29, 1999 (JP) .......................................... 11-184318

(51) Int. Cl.$^7$ ................................................ G06K 7/10
(52) U.S. Cl. ................................ 235/462.01; 235/383
(58) Field of Search ........................... 235/436, 462.01, 235/462.02–462.15, 462.35–462.49, 472, 454, 494, 375, 383, 380, 381, 470

(56) References Cited

U.S. PATENT DOCUMENTS

| | | | | |
|---|---|---|---|---|
| 4,723,212 A | * | 2/1988 | Mindrum et al. | 364/401 |
| 4,910,672 A | * | 3/1990 | Off et al. | 364/405 |
| 5,128,520 A | * | 7/1992 | Rando et al. | 235/375 |
| 5,173,251 A | * | 12/1992 | Ullrich et al. | 376/389 |
| 5,353,218 A | * | 10/1994 | De Lapa et al. | 364/401 |
| 5,481,094 A | * | 1/1996 | Suda | 235/383 |
| 5,710,886 A | * | 1/1998 | Christensen et al. | 395/214 |
| 5,822,735 A | * | 10/1998 | De Lappa et al. | 705/14 |
| 5,905,246 A | * | 5/1999 | Fajknowski | 235/375 |
| 6,055,513 A | * | 4/2000 | Katz et al. | 705/26 |
| 6,076,068 A | * | 6/2000 | De Lappa et al. | 705/14 |
| RE37,166 E | * | 5/2001 | Rando et al. | 235/462.36 |
| 2001/0018664 A1 | * | 8/2001 | Jacoves et al. | 705/14 |

FOREIGN PATENT DOCUMENTS

| | | | |
|---|---|---|---|
| JP | 404335496 A | * | 11/1962 |
| JP | 61-140825 | | 6/1986 |
| JP | 63-232133 | | 9/1988 |
| JP | 1-281564 | | 11/1989 |
| JP | 4-229392 | | 8/1992 |
| JP | 4-276880 | | 10/1992 |
| JP | 8-77256 | | 3/1996 |
| JP | 8-212459 | | 8/1996 |
| JP | 411174958 A | * | 7/1999 |
| JP | 411250351 A | * | 9/1999 |
| JP | 411288219 A | * | 10/1999 |
| JP | 2001/121755 A | * | 5/2001 |
| JP | 2001/216565 A | * | 8/2001 |

* cited by examiner

*Primary Examiner*—Thien M. Le
(74) *Attorney, Agent, or Firm*—Dickstein, Shapiro, Morin & Oshinsky, LLP

(57) ABSTRACT

The invention provides a POS system which does not make an error in discounting with a simple construction and is high in credit of a customer. When it is intended to provide a discount service, a bar code production apparatus produces a label of a bar code which includes information of a commodity before the commodity is discounted and discount information of the commodity. Upon settlement for the commodity with a POS apparatus, the thus produced bar code label is read in, and the price of the commodity prior to the discount and the price after the discount are indicated definitely to the customer during settlement.

6 Claims, 7 Drawing Sheets

FIG.2

| COMMODITY CODE | COMMODITY NAME | AMOUNT OF MONEY |
|---|---|---|
| 4912345678901 | RADISH | ¥150 |
| 4923456789012 | CARROT | ¥200 |
| ⋮ | ⋮ | ⋮ |

PRE-DISCOUNT CODE 4 9 1 2 3 4 5 6 7 8 9 0 1

POST-DISCOUNT CODE 4 9 1 2 3 4 5 6 7 8 9 0 1        1 0 0 0 0

POS SYSTEM

BACKGROUND OF THE INVENTION

1. Field of the Invention

The present invention relates to POS (point-of-sales) system, and more particularly to a POS system which can process information regarding discounting.

2. Description of the Related Art

As a system for sales information management, a POS system has been spread widely in retail stores and so forth in recent years. In the POS system, a bar code applied to each commodity is read to decide a sales price. In recent years, services provided by retail stores and so forth have been and are diversified, and above all, a discount service is one of services which are provided frequently.

The following forms are available for provision of a discount service while a POS system is used.

In a first form, an ordinary price is indicated, and a discount seal is adhered to the commodity and its commodity tag. In this instance, an operator who operates a POS apparatus will visually observe the discount seal to confirm a discount amount of money and input the discount amount of money using a keyboard section connected to a POS control section. The POS control section thus searches for pre-discount price information, which is price information before the discount of the commodity, from bar code data, subtracts the inputted discount amount of money from the pre-discount price to decide the discounted price and displays the discounted price.

As a second form, such a discount system as disclosed in Japanese Patent Laid-Open No. 212459/1996 is available. In the system, a discount amount of money is indicated in a bar code and discounting processing is performed based on the bar code.

As a third form, such a discount system as disclosed in Japanese Patent Laid-Open No. 232133/1988 is available. In the system, when discounting is to be performed, a portable bar code label processing apparatus of the handy type is used to read a label, subtract an amount of money designated by a discounting method from the pre-discount amount of money thus read from the label and re-issue a bar code label based on resulting data.

As a fourth form, such a discount system as disclosed in Japanese Patent Laid-Open No. 77256/1996 is available. In the system, information regarding sales conditions which vary depending upon the time, hour or the like such as a discount period, a discount price and a discount rate is marked on a multi-dimensional bar code, and the multi-dimensional bar code is read to provide a discount service or the like.

The conventional POS systems described above have the following problems.

According to the first form, determination of a discount amount of money and so forth upon settlement depends upon inputting of an operator, and an error cannot be eliminated completely and it is cumbersome to perform an inputting operation successively.

In the second form, where the bar code inputting apparatus is of the type which is usually used in a supermarket or the like and wherein a commodity is moved in front of a laser irradiating window of a scanner to read a bar code applied to the commodity, a bar code on which discount information is marked cannot sometimes be read. If a discount bar code cannot be read correctly, then the commodity cannot be discounted, which may result in loss of credit of the customer.

In the third form, since a bar code label produced with new data obtained by discounting calculation based on pre-discount data read by means of a scanner is applied to the commodity, the pre-discount data is not known to the POS system. Consequently, there is a problem that the customer cannot know by what amount of money the commodity is discounted.

According to the fourth form, various information can be written using a multi-dimensional bar code. However, it is not popular to use a multi-dimensional bar code with a POS system, and it is necessary to construct unique hardware. Thus, the system of the fourth form is low in universal use.

SUMMARY OF THE INVENTION

It is an object of the present invention to provide a POS system which does not make an error in discounting with a simple construction and is high in credit of a customer.

In order to attain the object described above, according to the present invention, there is provided a POS system, comprising a bar code production apparatus for producing a bar code which includes discount information of a commodity, and a POS apparatus for reading information of the bar code produced by the bar code production apparatus and performing settlement processing based on the read information, the bar code production apparatus including bar code reading means for reading a bar code of a commodity before the commodity is discounted, discount money amount inputting means for inputting a discount amount of money for the commodity whose bar code has been read by the bar code reading means, bar code production means for producing a bar code which includes the pre-discount commodity information and the discount money amount information based on the bar code read by the bar code reading means and the discount money amount inputted by the discount money amount inputting means, and bar code outputting means for outputting the bar code produced by the bar code production means, the POS apparatus including POS bar code reading means for reading a bar code, bar code discrimination means for discriminating whether or not the bar code read by the POS bar code reading means has been produced by the bar code production means of the bar code production apparatus and includes discount information, price calculation means for calculating, if it is discriminated by the bar code discrimination means that the bar code read by the bar code reading means includes discount money amount information, a post-discount price of the commodity based on information of the read bar code, and price outputting means for outputting the post-discount price calculated by the price calculation means together with the pre-discount price.

Thus, the POS system comprises the bar code production apparatus for producing a bar code which includes discount information of a commodity, and the POS apparatus for reading information of the bar code produced by the bar code production apparatus and performing settlement processing based on the read information. In the POS system, settlement for a commodity to be purchased by a customer including discounting of the commodity is performed by the POS apparatus. To this end, the bar code reading means of the bar code production apparatus reads a bar code of a commodity before the commodity is discounted, and the discount money amount inputting means inputs a discount amount of money for the commodity whose bar code has been read by the bar code reading means.

After the bar code of the commodity before it is discounted is read by the bar code reading means and the discount amount of money is inputted by the discount money amount inputting means, the bar code production means produces a bar code which includes the pre-discount commodity information and the discount money amount information based on the bar code read by the bar code reading means and the discount money amount inputted by the discount money amount inputting means. After the bar code production means produces the bar code which includes the pre-discount commodity information and the discount money amount information, the bar code outputting means outputs the bar code produced by the bar code production means. Accordingly, if a label of the bar code thus produced is applied to the commodity, then the POS apparatus can process the discount information.

The POS bar code reading means of the POS apparatus reads the bar code, and the bar code discrimination means discriminates whether or not the bar code read by the POS bar code reading means has been produced by the bar code production means of the bar code production apparatus and includes discount information. If it is discriminated by the bar code discrimination means that the bar code read by the bar code reading means includes discount money amount information, then the price calculation means calculates a post-discount price of the commodity based on information of the read bar code.

Further, the price outputting means outputs the post-discount price calculated by the price calculation means together with the pre-discount price. Consequently, the POS system can perform a discount service upon settlement and definitely indicates to the customer that a discount service is provided.

Consequently, with the POS system, since the bar code production apparatus and the POS apparatus handle a bar code to which discount information is added, an error in discounting caused by a failure in reading of a discount bar code can be prevented. Further, since a pre-discount price and a post-discount price are definitely indicated to a customer, the trust of the customer can be maintained.

Here, the bar code production means of the bar code production apparatus is required only to produce a bar code which includes discount money amount information, and can be constructed in various manners. Thus, the POS system may be constructed particularly such that the bar code production means of the bar code production apparatus produces a bar code of a standard different from an ordinary standard for a bar code for a commodity, and the POS bar code reading means of the POS apparatus is capable of reading the bar code of the standard different from the ordinary standard for a bar code for a commodity.

The bar code to be used for processing in the POS system is a standardized bar code, and the bar code production means of the bar code production apparatus produces a bar code of a standard different from an ordinary standard for a bar code for a commodity. Then, the POS bar code reading means of the POS apparatus is constructed so as to read the bar code of the standard different from the ordinary standard for a bar code for a commodity. Consequently, the POS apparatus can handle discount information by reading the bar code of the different standard.

Thus, the POS system is advantageous in that it can handle ordinary commodity information and discount information simply.

The bar code of the standard different from the ordinary standard for a bar code for a commodity can be produced in various manners. Thus, the POS system may be constructed such that the bar code production means of the bar code production apparatus adds discount money amount information to information of an ordinary bar code for a commodity to produce a bar code of a standard different from an ordinary standard for a bar code of a commodity.

Information included in an ordinary bar code for a commodity includes the price of a commodity prior to discount, the name of the commodity and so forth, and the information mentioned is used also in the POS system to which the present invention is applied. Thus, the bar code production means adds the discount money amount information to the information of the ordinary bar code for a commodity to produce a bar code of the standard different from the ordinary standard for a bar code of a commodity. As a result, while the POS system can perform processing which can be performed by a conventional POS system, it can additionally perform discount processing.

Thus, the POS system is advantageous in that it can add discount information to ordinary commodity information simply.

Specific bar codes may be used for the bar codes of the ordinary standard for a commodity and the standard different from the ordinary standard for a commodity. In particular, the POS system may be constructed such that the bar code reading means of the bar code production apparatus reads a bar code of the JAN (Japanese Article Number) standard which is a standard bar code for a commodity prescribed by the Japanese Article Number, and the bar code production means produces a bar code of the CODE 128 standard and the bar code reading means of the POS apparatus is capable of reading the bar code of the CODE 128 standard.

Since the JAN standard is normally used as an ordinary bar code standard for a commodity in Japan, the bar code reading means of the bar code production apparatus reads a bar code of the JAN standard which is a standard bar code for a commodity in Japan. Since the JAN standard allows handling of data only of 13 figures, in order to use discount information, a bar code standard is preferably used which can handle a greater number of figures than the JAN standard.

Therefore, the bar code production means of the bar code production apparatus produces a bar code of the CODE 128 standard, and the bar code reading means of the POS apparatus is constructed so as to read the bar code of the CODE 128 standard. Accordingly, the POS apparatus can handle discount information while using the predetermined standard of the CODE 128.

Thus, the POS system is advantageous in that it is high in universal use since it basically uses an ordinary bar code standard for a commodity.

Since the POS system to which the present invention is applied can handle discount information in this manner, it is desirable to definitely indicate to the customer upon settlement that a discount service is provided. Thus, preferably the price outputting means of the POS apparatus displays the pre-discount price and the post-discount price so as to be visually observed by a customer upon settlement for the commodity.

In particular, generally a POS system is constructed such that, when settlement processing is performed, the price of an individual commodity can be visually observed by a customer. Thus, in the POS system to which the present invention is applied, in order to indicate to the customer that a discount service is provided actually, the price outputting means of the POS apparatus displays the pre-discount price and the post-discount price so as to be visually observed by a customer upon settlement for the commodity. As a result, the customer can visually discriminate whether or not each individual commodity is discounted actually, and also to the store side, it is advantageous that the customer does not have an unnecessary distrust to the store.

In order to indicate contents of a discount service more definitely to a customer, preferably the price outputting means of the POS apparatus outputs a receipt on which the pre-discount price and the post-discount price are printed after settlement for the commodity.

In particular, usually a POS system issues a receipt to a customer in almost all cases after settlement processing is performed. Therefore, in order to definitely indicate to a customer that a discount service is provided actually, the price outputting means of the POS apparatus outputs a receipt on which the pre-discount price and the post-discount price are printed after settlement for the commodity. As a result, a customer can confirm on the receipt whether or not each individual commodity is discounted actually, and can confirm contents of any service readily even after time passes after the settlement. Consequently, the POS system can maintain the trust of the customer.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a table illustrating a form of commodity information used in the POS system;

DESCRIPTION OF THE PREFERRED EMBODIMENT

Figure 1:
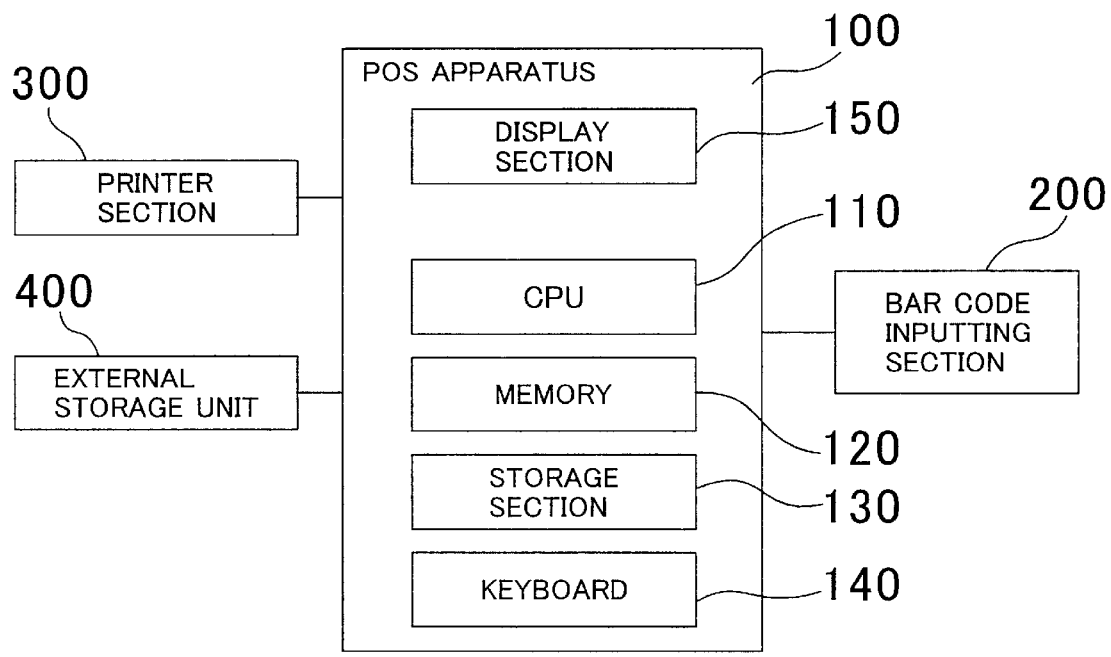
FIG. 1 is a block diagram showing a construction of a POS apparatus used in a POS system to which the present invention is applied.

Referring first to FIG. 1, there is shown in block diagram a construction of a POS apparatus used in a POS system to which the present invention is applied. The POS apparatus is generally denoted at 100 and includes a CPU 110, a memory 120, and a storage section 130. The CPU 110 performs predetermined processing based on a program stored in the memory 120 or/and the storage section 130 and using the memory 120 as a work area. The POS apparatus 100 further includes a keyboard 140 and a display section 150. An operator thus operates the POS apparatus 100 through the keyboard 140 to perform settlement processing. The display section 150 displays thereon bar code data read by a bar code inputting section 200 described below or data searched out or calculated based on the thus read bar code data.

The bar code inputting section 200, a printer section 300 and an external storage unit 400 are connected to the POS apparatus 100. The bar code inputting section 200 reads a bar code applied to a commodity or printed on a price tag adhered to a commodity. The bar code inputting section 200 can read an ordinary bar code of the JAN standard for goods and a bar code of the CODE 128 standards produced by a bar code production apparatus 500 which is hereinafter described.

The printer section 300 prints commodity information of a commodity to issue a receipt to be handed to a customer. The external storage unit 400 stores commodity information and so forth in such a form as seen in FIG. 2, and the CPU 110 in the POS apparatus 100 searches the information stored in the external storage unit 400 for commodity information conforming with read bar code information.

The POS system must have commodity information stored in advance therein, and an operator can use the POS apparatus 100 to register such commodity data. In this instance, the bar code inputting section 200 reads a bar code applied to a commodity or printed on a price tag applied to a commodity and transmits the read bar code data to the CPU 110 of the POS apparatus 100. In the POS system, the inputted bar code data is used as a key code for searching for and specifying the commodity information data, and a search file for such commodity information data is stored in the storage section 130 of the POS apparatus 100 or the external storage unit 400 outside the POS apparatus 100.

Figure 3:
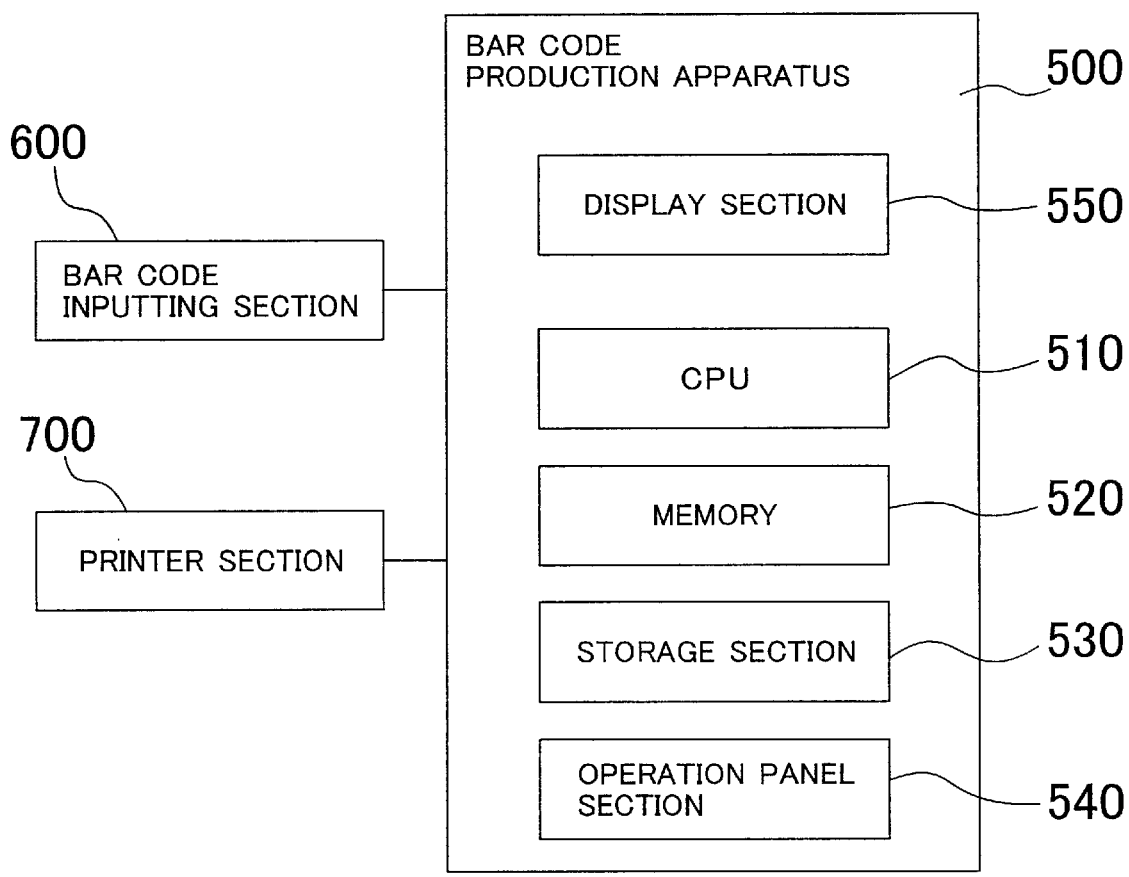
FIG. 3 is a block diagram showing a construction of a bar code production apparatus in the POS system of FIG. 1.

FIG. 3 shows in block diagram a construction of the bar code production apparatus in the POS system to which the present invention is applied.

Referring to FIG. 3, the bar code production apparatus 500 includes a CPU 510, a memory 520, and a storage section 530. The CPU 510 uses the memory 520 as a work area based on a program stored in the memory 520 or the storage section 530 to execute predetermined processing.

The bar code production apparatus 500 further includes an operation panel section 540 and a display section 550. An operator can input a discount amount of money for a commodity using the operation panel section 540 and operate the bar code production apparatus 500 to produce a bar code label. The display section 550 displays bar code data, contents inputted from the operation panel section 540 and so forth.

A bar code inputting section 600 and a printer section 700 are connected to the bar code production apparatus 500. The bar code inputting section 600 reads a bard code applied to a commodity or printed on a price tag adhered to a commodity. Particularly, the bar code inputting section 600 reads an ordinary bar code of the JAN standard for goods. The printer section 700 outputs a label on which a bar code of the CODE 128 standard is printed.

In the bar code production apparatus 500, commodity information is read from a JAN standard bar code, and the CPU 510 performs predetermined operation to convert the commodity information into a bar code of the CODE 128 standard. Then, a label of the CODE 128 standard bar code obtained by the conversion is printed.

Figure 4A:
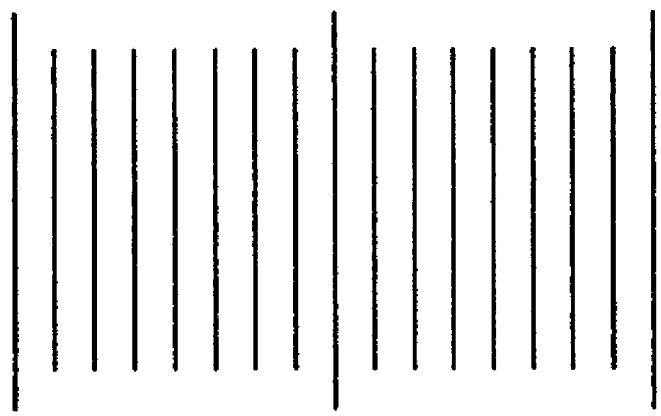
FIGS. 4(a) and 4(b) are schematic views illustrating an example of conversion from a JAN standard bar code to a CODE 128 standard bar code.
Figure 4B:
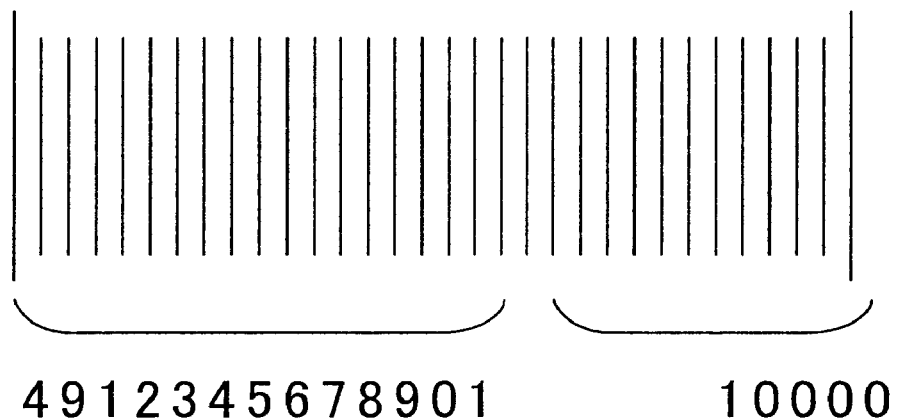

FIGS. 4(a) and 4(b) illustrate an example of conversion from a JAN standard bar code to a CODE 128 standard bar code, and particularly, FIG. 4(a) shows a JAN standard bar code and FIG. 4(b) shows a CODE 128 standard bar code obtained by such conversion as mentioned above.

The JAN standard is prescribed as standard of a bar code system for goods, and data placed in a bar code of the JAN standard includes 13 figures as seen in FIG. 4(a). The bar code production apparatus 500 reads a pre-discount bar code which is a bar code representative of commodity information of the commodity prior to discount, and combines the thus read bar code data with data inputted from the operation panel section 540 to make data for one bar code. In this instance, however, according to the JAN standards, only 13 figures can be used for the combined bar code data. Accordingly, the bar code production apparatus 500 produces a bar code of another bar code system which can use data of more than 13 figures. Here, the bar code production apparatus 500 produces a bar code of the CODE 128 standard. As a result, the thus produced code has more than 13 figures and has such a form as seen in FIG. 4(b).

Figure 5:
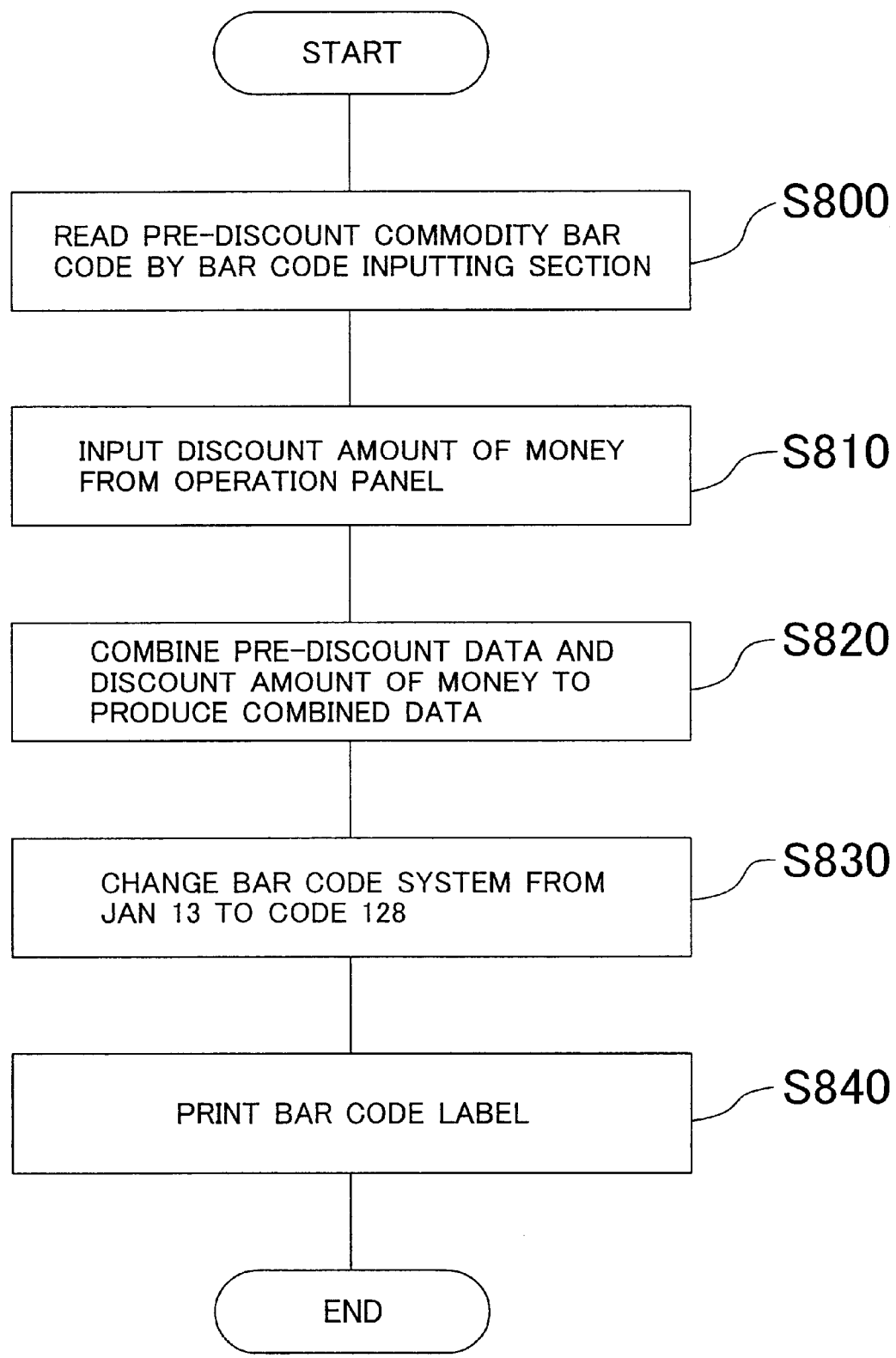
FIG. 5 is a flow chart illustrating a flow of processing of the bar code production apparatus of FIG. 3.

In the following, a flow of processing of the bar code production apparatus 500 having the construction described above is described with reference to a flow chart of FIG. 5.

Where it becomes necessary to discount a commodity in a store or the like in which the POS system is employed, the bar code production apparatus 500 is used to produce a discount bar code label. To this end, the bar code inputting section 600 of the bar code production apparatus 500 is used to read a pre-discount commodity bar code in step S800. Then, the operator will use the operation panel section 540 to input a desired discount among of money in step S810.

Consequently, the CPU 510 performs predetermined arithmetic operation to combine the pre-discount commodity information read by the bar code inputting section 600 and the discount amount of money inputted through the operation panel section 540 to produce combination data in step S820, and changes the bar code system from the JAN standard to the CODE 128 standard in step S830. Then, the CPU 510 controls the printer section 700 to print a bar code of the CODE 128 standard thus changed as a bar code label in step S840. As a result, the bar code which includes the discount information of the commodity is produced, and the operator will apply the bar code in an overlapping relationship to the pre-discount bar code prior.

Figure 6:
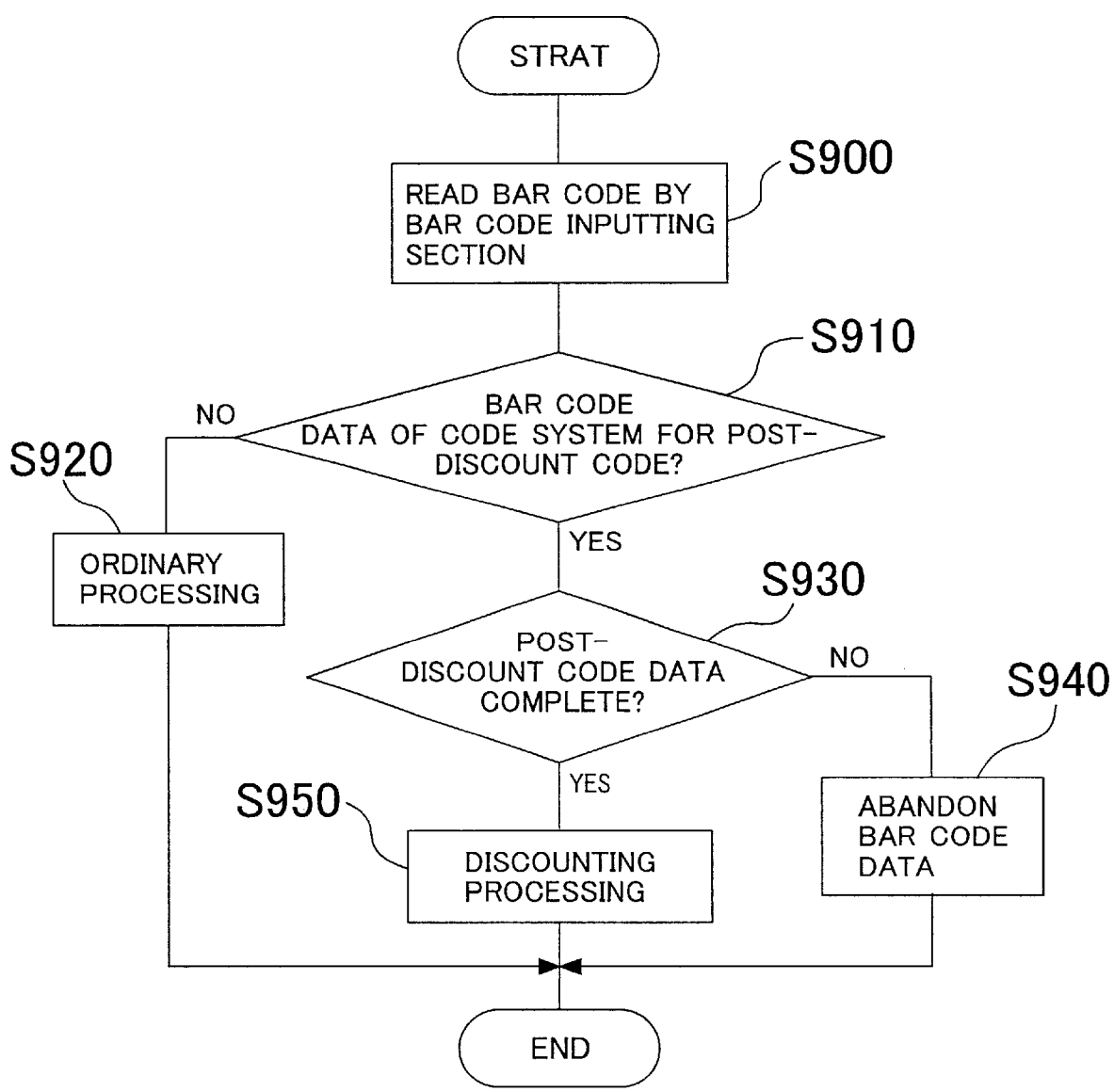
FIG. 6 is a flow chart illustrating a flow of processing of the POS apparatus shown in FIG. 1.

Now, a flow of processing of the POS apparatus 100 is described with reference to a flow chart of FIG. 6.

In order to perform settlement processing for a commodity, the operator will operate the bar code inputting section 200 to read in a bar code applied to the commodity in step S900. Then in step S910, the CPU 110 discriminates whether or not the bar code read in is such a bar code which complies with the CODE 128 standard as produced by the bar code production apparatus 500 described above. If it is not discriminated in step S910 that the bar code complies with the CODE 128 standard, then the CPU 110 performs, in step S920, such settlement processing for a bar code for an ordinary commodity as is performed conventionally.

Conversely, if it is discriminated in step S910 that the bar code complies with the CODE 128 standard, then the CPU 110 discriminates in step S930 whether or not the discount bar code data is complete, that is, whether or not the inputted discount bar code has a format including a pre-discount price and a discount amount of money. If it is not discriminated in step S930 that the discount bar code includes a pre-discount price and a discount amount of money, then the CPU 110 abandons the bar code data in step S940.

Conversely if it is discriminated in step S930 that the discount bar code includes both of a pre-discount price and a discount amount of money, then the CPU 110 performs, in step S950, settlement processing taking the discount amount of money into consideration. Here in step S950, when the settlement processing is performed, the pre-discount price is displayed on the display section 150 and also the post-discount price which is a price after the discount is displayed, and the printer section 300 prints the pre-discount price and the post-discount price on a receipt to be handed to the customer.

Now, operation of the POS system is described.

Principally the following two manners are available to discount a commodity for sales in a mass sales store such as a supermarket. As a first discount manner, the commodity price of a fixed commodity is discounted by a fixed amount of money for a fixed period for discount sales or the like. In this instance, since discount information is known in advance, discounting for the fixed period of time can be performed if the amount of money and the period of the discount information are placed into the commodity information data file.

As a second method, a seal or a price tag is sometimes applied to a commodity to discount the commodity such that a seal for discount by a certain amount of money is applied or a seal for reducing a price to one half is applied immediately before the store is closed or the like in order to sell out commodities such as fresh food. In this type of discounting, the discount period is not fixed, but an object commodity to be discounted, the discount amount of money and so forth are decided by judgment of a clerk. The POS system to which the present invention is applied can be suitably used for such discounting of the second manner as described above.

When a salesperson of fresh food or the like discounts in this manner, an operator will operate the bar code inputting section 600 of the bar code production apparatus 500 of the POS system to which the present invention is applied to read in a JAN standard bar code for an ordinary commodity applied to a commodity to be discounted. Further, the operator will operate the operation panel section 540 to input a discount amount of money. Consequently, the CPU 510 produces a bar code of the CODE 128 standard from the information based on the bar code read in by the bar code inputting section 600 and the discount information and controls the printer section 700 to print a bar code label. The bar code label printed in this instance complies with the CODE 128 standard and includes the discount information.

If a customer carries the commodity to which the bar code label is applied to a register of the supermarket in order to purchase the commodity, then a register operator can perform settlement processing without getting conscious of whether or not the commodity is a discounted commodity. In particular, the register operator will operate the bar code inputting section 200 connected to the POS apparatus 100 to read the bar code applied to the commodity. In this instance, the CPU 110 of the POS apparatus 100 discriminates, in step S910 described hereinabove with reference to FIG. 6, whether or not the bar code read is a bar code produced by the bar code production apparatus 500 described hereinabove. Consequently, the POS apparatus 100 can perform its processing whether the bar code is an ordinary bar code of the JAN standard or a bar code of the CODE 128 standard.

When the CPU 110 performs settlement processing, it uses the bar code data unique to the commodity as a key code to search for commodity information such as the price, the commodity name and so forth of the commodity from the commodity information data file stored in the external storage unit 400. Here, if the commodity has a bar code applied thereto which includes the discount information according to the CODE 128 standard, then the CPU 110 performs settlement processing while the display section 150 displays the pre-discount price and the post-discount price. Further, the pre-discount price and the post-discount price are printed also on a receipt to be handed to the customer. Accordingly, it can be indicated definitely to the customer that the commodity is discounted.

In this manner, where the POS system to which the present invention is applied is employed, when a discount service is to be provided, the bar code production apparatus produces a bar code label which includes both of information of a commodity prior to discount and discount information. Then, upon settlement with the POS apparatus, the bar code label thus produced is read in and the pre-discount price and the post-discount price are indicated definitely to the customer to perform settlement. Accordingly, the POS system can prevent a discount miss with a simple construction and secure high credit of customer.

While a preferred embodiment of the present invention has been described using specific terms, such description is for illustrative purposes only, and it is to be understood that changes and variations may be made without departing from the spirit or scope of the following claims.

What is claimed is:

1. A POS system, comprising:
    a bar code production apparatus for producing a bar code which includes discount information of a commodity; and
    a POS apparatus for reading information of the bar code produced by said bar code production apparatus and performing settlement processing based on the read information;
    said bar code production apparatus including bar code reading means for reading a bar code of a commodity before the commodity is discounted, discount money amount inputting means for inputting a discount amount of money for the commodity whose bar code has been read by said bar code reading means, bar code production means for producing a bar code which includes the pre-discount commodity information and the discount money amount information based on the bar code read by said bar code reading means and the discount money amount inputted by said discount money amount inputting means, and bar code outputting means for outputting the bar code produced by said bar code production means;
    said POS apparatus including POS bar code reading means for reading a bar code, bar code discrimination means for discriminating whether or not the bar code read by said POS bar code reading means has been produced by said bar code production means of said bar code production apparatus and includes discount information, price calculation means for calculating, if it is discriminated by said bar code discrimination means that the bar code read by said bar code reading means includes discount money amount information, a post-discount price of the commodity based on information of the read bar code, and price outputting means for outputting the post-discount price calculated by said price calculation means together with the pre-discount price.

2. A POS system as claimed in claim 1, wherein said bar code production means of said bar code production apparatus produces a bar code of a standard different from an ordinary standard for a bar code for a commodity, and said POS bar code reading means of said POS apparatus is capable of reading the bar code of the standard different from the ordinary standard for a bar code for a commodity.

3. A POS system as claimed in claim 1, wherein said bar code production means of said bar code production apparatus adds discount money amount information to information of an ordinary bar code for a commodity to produce a bar code of a standard different from an ordinary standard for a bar code of a commodity.

4. A POS system as claimed in claim 1, wherein said bar code reading means of said bar code production apparatus reads a bar code of the JAN standard which is a standard bar code for a commodity prescribed by the Japanese Article Number, and said bar code production means produces a bar code of the CODE 128 standard and said bar code reading means of said POS apparatus is capable of reading the bar code of the CODE 128 standard.

5. A POS system as claimed in claim 1, wherein said price outputting means of said POS apparatus displays the pre-discount price and the post-discount price so as to be visually observed by a customer upon settlement for the commodity.

6. A POS system as claimed in claim 1, wherein said price outputting means of said POS apparatus outputs a receipt on which the pre-discount price and the post-discount price are printed after settlement for the commodity.

* * * * *